(12) United States Patent
Hsu

(10) Patent No.: US 8,319,464 B2
(45) Date of Patent: Nov. 27, 2012

(54) FLUX CONTROL AND ONE-HUNDRED AND EIGHTY DEGREE CORE SYSTEMS

(75) Inventor: John S. Hsu, Oak Ridge, TN (US)

(73) Assignee: U.S. Department of Energy, Washington, DC (US)

( * ) Notice: Subject to any disclaimer, the term of this patent is extended or adjusted under 35 U.S.C. 154(b) by 771 days.

(21) Appl. No.: 12/543,039

(22) Filed: Aug. 18, 2009

(65) Prior Publication Data
US 2011/0043154 A1 Feb. 24, 2011

(51) Int. Cl.
H02P 27/00 (2006.01)
H02K 1/12 (2006.01)
H02K 1/06 (2006.01)

(52) U.S. Cl. .......... 318/400.41; 318/538; 318/632; 310/179; 310/216.009; 310/112; 310/254.1; 310/216.032

(58) Field of Classification Search .......... 318/503, 318/538, 629, 632, 635, 400.01, 400.41; 310/178, 190, 191, 164–166, 168, 179, 162, 310/216.004, 216.113, 216.009, 216.072, 310/216.073, 216.114, 216.129, 266, 112, 310/114, 254.1, 216.001, 216.025, 216.026, 310/216.027, 216.029, 216.032, 216.035, 310/216.061, 216.111, 216.109
See application file for complete search history.

(56) References Cited

U.S. PATENT DOCUMENTS

| | | | | |
|---|---|---|---|---|
| 4,260,923 A * | 4/1981 | Rawcliffe | | 310/184 |
| 5,272,429 A * | 12/1993 | Lipo et al. | | 318/808 |
| 5,285,144 A * | 2/1994 | Hsu et al. | | 318/807 |
| 5,334,923 A * | 8/1994 | Lorenz et al. | | 318/805 |
| 5,510,689 A * | 4/1996 | Lipo et al. | | 318/809 |
| 5,541,488 A * | 7/1996 | Bansal et al. | | 318/801 |
| 6,218,753 B1 * | 4/2001 | Asano et al. | | 310/156.53 |
| 6,707,224 B1 * | 3/2004 | Petersen | | 310/254.1 |
| 6,710,495 B2 * | 3/2004 | Lipo et al. | | 310/184 |
| 6,891,301 B1 | 5/2005 | Hsu | | |
| 6,977,454 B2 | 12/2005 | Hsu | | |
| 7,134,180 B2 | 11/2006 | Hsu | | |
| 7,135,802 B2 | 11/2006 | Seki et al. | | |
| 7,270,203 B2 | 9/2007 | Hsu | | |
| 7,733,044 B2 * | 6/2010 | Nakamura et al. | | 318/400.02 |
| 7,825,552 B2 * | 11/2010 | Husband et al. | | 310/59 |

(Continued)

OTHER PUBLICATIONS

Fitzgerald, A. E. et al., Chapter 7, "Engineering Considerations," Fig. 7-16, Electric Machinery: The Dynamics and Statics of Electromechanical Energy Conversion, 2nd Ed., McGraw-Hill Book Company, New York, NY, Copyright 1961, pp. 362.

(Continued)

*Primary Examiner* — Eduardo Santana
(74) *Attorney, Agent, or Firm* — Brinks Hofer Gilson & Lione

(57) ABSTRACT

A two-phase or four-phase electric machine includes a first stator part and a second stator part disposed about ninety electrical degrees apart. Stator pole parts are positioned near the first stator part and the second stator part. An injector injects a third-harmonic frequency current that is separate from and not produced by the fundamental current driving the first stator part and the second stator part. The electric angular speed of the third-harmonic rotating field comprises $$\frac{p \cdot \theta}{t},$$

where p comprises the number of pole pairs, θ comprises a mechanical angle and t comprise time in seconds.

23 Claims, 11 Drawing Sheets

U.S. PATENT DOCUMENTS

| | | | |
|---|---|---|---|
| 7,839,048 B2 * | 11/2010 | Jansen et al. | 310/266 |
| 8,044,551 B2 * | 10/2011 | Kim | 310/216.109 |
| 8,089,192 B2 * | 1/2012 | Li et al. | 310/216.009 |
| 8,233,295 B2 * | 7/2012 | Ransom et al. | 363/41 |
| 2002/0130574 A1 * | 9/2002 | Takahata et al. | 310/156.53 |
| 2003/0201686 A1 * | 10/2003 | Narita et al. | 310/211 |
| 2005/0218749 A1 * | 10/2005 | Shin et al. | 310/217 |
| 2005/0275303 A1 * | 12/2005 | Tetmeyer | 310/166 |
| 2006/0202586 A1 * | 9/2006 | Shim et al. | 310/216 |
| 2008/0054740 A1 * | 3/2008 | Kim et al. | 310/60 R |
| 2009/0102314 A1 * | 4/2009 | Miyata et al. | 310/257 |
| 2010/0186687 A1 * | 7/2010 | Kim et al. | 123/41.57 |
| 2010/0207482 A1 * | 8/2010 | Kim et al. | 310/215 |
| 2010/0237726 A1 * | 9/2010 | Hayakawa et al. | 310/64 |
| 2011/0193444 A1 * | 8/2011 | Maruyama | 310/215 |
| 2011/0221366 A1 * | 9/2011 | Gallegos-Lopez et al. | 318/400.02 |
| 2012/0175994 A1 * | 7/2012 | Flynn | 310/216.106 |
| 2012/0223600 A1 * | 9/2012 | Tonogi et al. | 310/46 |

OTHER PUBLICATIONS

Parsa, L. et al., "Five-Phase Interior Permanent Magnet Motor with Low Torque Pulsation," *IEEE*, 2005, pp. 1770-1775.

\* cited by examiner

US 8,319,464 B2

FLUX CONTROL AND ONE-HUNDRED AND EIGHTY DEGREE CORE SYSTEMS

GOVERNMENT INTEREST

This application was made with United States government support under Contract No. DE-AC05-00OR22725 awarded by the United States Department of Energy. The United States Government has certain rights in these inventions.

BACKGROUND OF THE INVENTION

1. Technical Field

This disclosure relates to systems that convert electric energy into mechanical energy or vice versa and, more particularly to an arrangement of coils and/or magnets that covert electric current into mechanical power or vice versa.

2. Related Art

Some motors and generators generate many current components and fluxes including certain third harmonic currents and fluxes (e.g., the alternating cycle is three times the fundamentals). Under certain conditions such as when the power density of an electric machine is very high, the magnetic saturation in the electric machine may become very high. A third-harmonic flux within the air gap of the machine may be a by product of this saturation.

Unfortunately, in some electric machines third harmonic currents render zero-sequence currents that do not generate torque. Zero-sequence third-harmonic ampere-turns in a three phase machine, for example, may buck each other in the air gap. The counter balance of such forces may produce no torque since torque is produced by the stator ampere-turns interacting with the rotor flux.

SUMMARY

A two-phase or four-phase electric machine includes a first stator part and a second stator part disposed about ninety electrical degrees apart. Stator pole parts are positioned near the first stator part and the second stator part. An injector injects a third-harmonic frequency current that is separate from and not produced by the fundamental current driving the first stator part and the second stator part. The electric angular speed of the third-harmonic rotating field comprises $$\frac{p \cdot \theta}{t},$$

where p comprises the number of pole pairs, θ comprises a mechanical angle, and t comprise time in seconds.

A second two-phase or four-phase electric machine includes a first stator part having a plurality of inner bobbin wound cores and a second stator part having a plurality of outer bobbin wound cores. Each of the outer bobbin wound cores are mechanically biased against at least one of the plurality inner bobbin wound cores. A substantially cylindrical support biases an outer diameter of the outer bobbin wound core against an outer surface of the inner bobbin wound core. A first-phase and a second-phase of the electric machine enables about a one-hundred and eighty-electric degree phase span.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
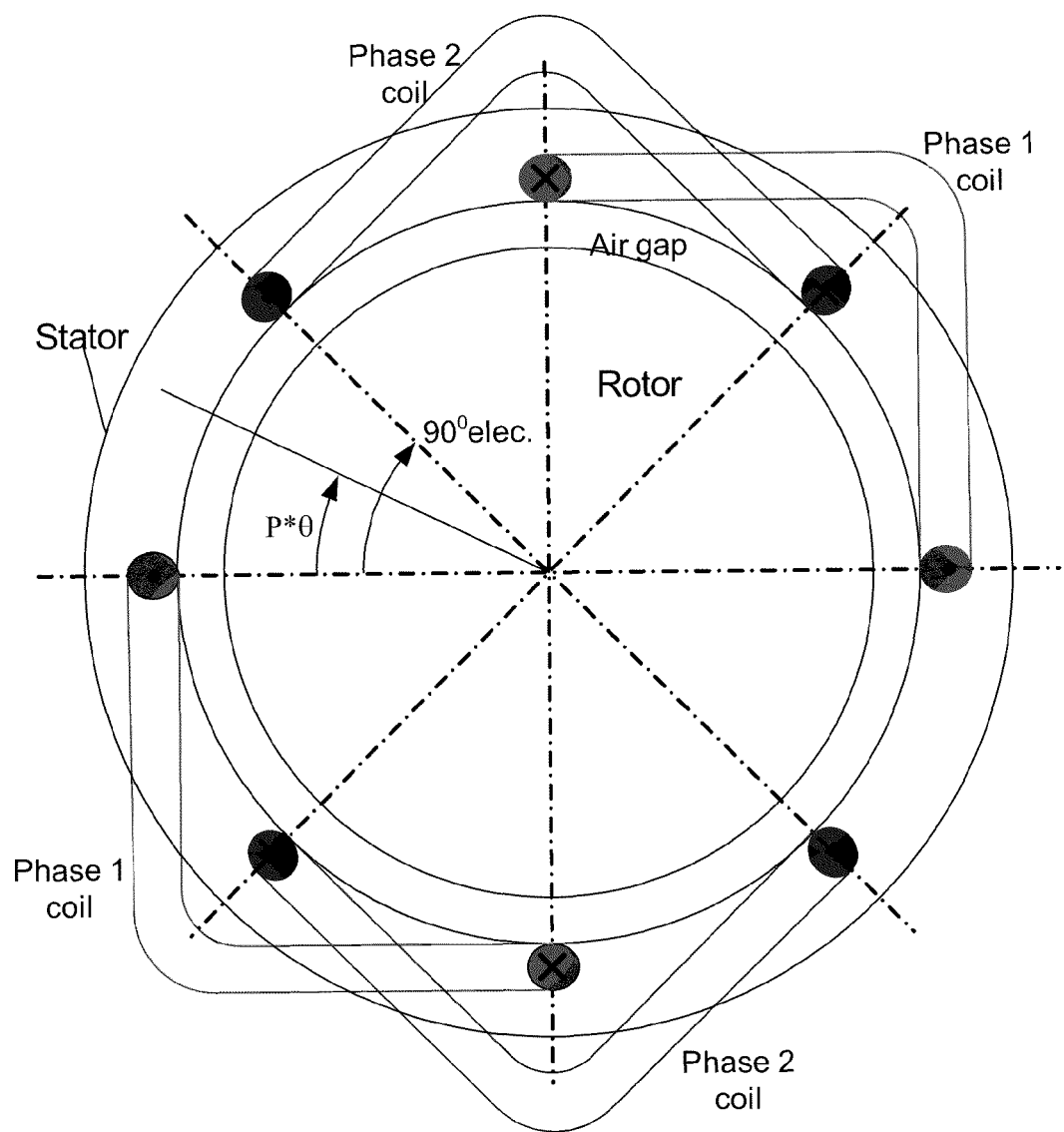
FIG. 1 is an exemplary portion of a four pole machine in cross-section.

A system may modify the flux that flows through an air gap in two-phase or four phase machines. A received or injected third harmonic current may produce a harmonic flux that is synchronous with a fundamental frequency current. As a rotating air gap flux is cut by stator windings, an additional third harmonic torque in synchronization with a fundamental frequency torque is produced. A third-harmonic current magnitude and phase shift may be adjusted or controlled by controlling the waveform and phase current (e.g., total phase current.) The additional (e.g., third harmonic magnitude) torque may be controlled by controlling the third-harmonic current magnitude and its phase shift. The system may interface or may be a unitary part of a voltage source inverter fed machine, current source inverter fed machine, or machines that are not fed by or interface one or more inverters (such as a machine connected directly to a utility supply source). Because the power of the third harmonic is normally small when compared to the full rating of a non-inverter-fed machine, such arrangement may benefit from the additional torque without the high cost of some alternatives.

The systems may be part of or interface permanent magnet (PM) machines (e.g., surface mount PM, interior PM mounts), induction machines, motors, generators, and/or PM-less synchronous machines, such as those described in U.S. patent application Ser. Nos. 12/274,895 entitled "Permanent-Magnet-Less Synchronous Reluctance System," 12/466,212 entitled "Permanent-Magnet-Less Machine Having an Enclosed Air Gap," and 12/466,169 entitled "Substantially Parallel Flux Uncluttered Rotor Machines," which are incorporated herein by reference. In some two-phase or four-phase stator winding machines, the windings may be distributed, substantially or nearly concentric (or concentrated), or may comprise bobbins (or individual wound core) windings, for example.

In a two-phase or a four-phase machine, stator third-harmonic currents may produce an air-gap third-harmonic rotating ampere-turns of the same rotating speed as the rotating field produced by the stator fundamental currents. By changing the shape of the air gap flux, the system produces additional torque (e.g., a smooth third-harmonic torque) without the need for additional phases such as a five-phase machine (that may require additional stator slots), additional electronic power switching components, or additional connection cables and connectors. The third-harmonic rotating ampere-turns interact with the rotor harmonic flux to produce the additional torque.

In operation, a fundamental frequency current flowing through the system's stator coils (or stator parts) may produce a fundamental flux distribution and a third-harmonic space waveform. While the fundamental flux distribution is useful (e.g., in an energy conversion: such as an electrical conversion into mechanical energy—motor or a mechanical conversion into electrical energy—generator), the third-harmonic space waveform produced from the fundamental current may be of little use. When a third-harmonic frequency current (that is not the fundamental frequency current) is received or injected into the stator windings (e.g., it may be synthetically produced by a third harmonic flux or naturally produced due to magnetic saturation), a third-harmonic fundamental current and a third-harmonic frequency component is generated. The third harmonic frequency current will be in synchronization (or substantially in sync) with the fundamental frequency current. The shape of the winding back electromotive force (emf) may be modified by injecting the third ($3^{rd}$) harmonic currents into two or four-phase stator windings. When the rotating air gap flux cuts the stator winding conductors the voltage of the back emf is produced.

In a two-phase or a four-phase machine, stator third-harmonic currents may produce an air-gap third-harmonic rotating ampere-turns of the same rotating speed as the rotating field produced by the stator fundamental currents. By changing the shape of the air gap flux, the shape of the induced electromotive force (EMF) in the stator winding may become more trapezoidal; consequently, the peak voltage of this trapezoidal waveform contains a higher fundamental peak voltage than the trapezoidal waveform's peak voltage. This may help to gain higher fundamental voltage when the permissible peak voltage is limited to a given value.

An exemplary four-pole machine is shown in FIG. 1. Because two-phase and four-phase windings may have substantially the same substantially 90 electric phase shift between phases, the same number of switching devices that control the fields may be used for the two or four phases that drive these systems. In some applications, a four-phase inverter may include four half-bridge legs (or full bridges or two H-bridge) for the two phases. Some four-phase half-bridge connections may provide a neutral connection; although, third-harmonic currents may flow without it. Some four-phase circuits provide a hop-along benefit when one or two phases are not in order.

Figure 2:
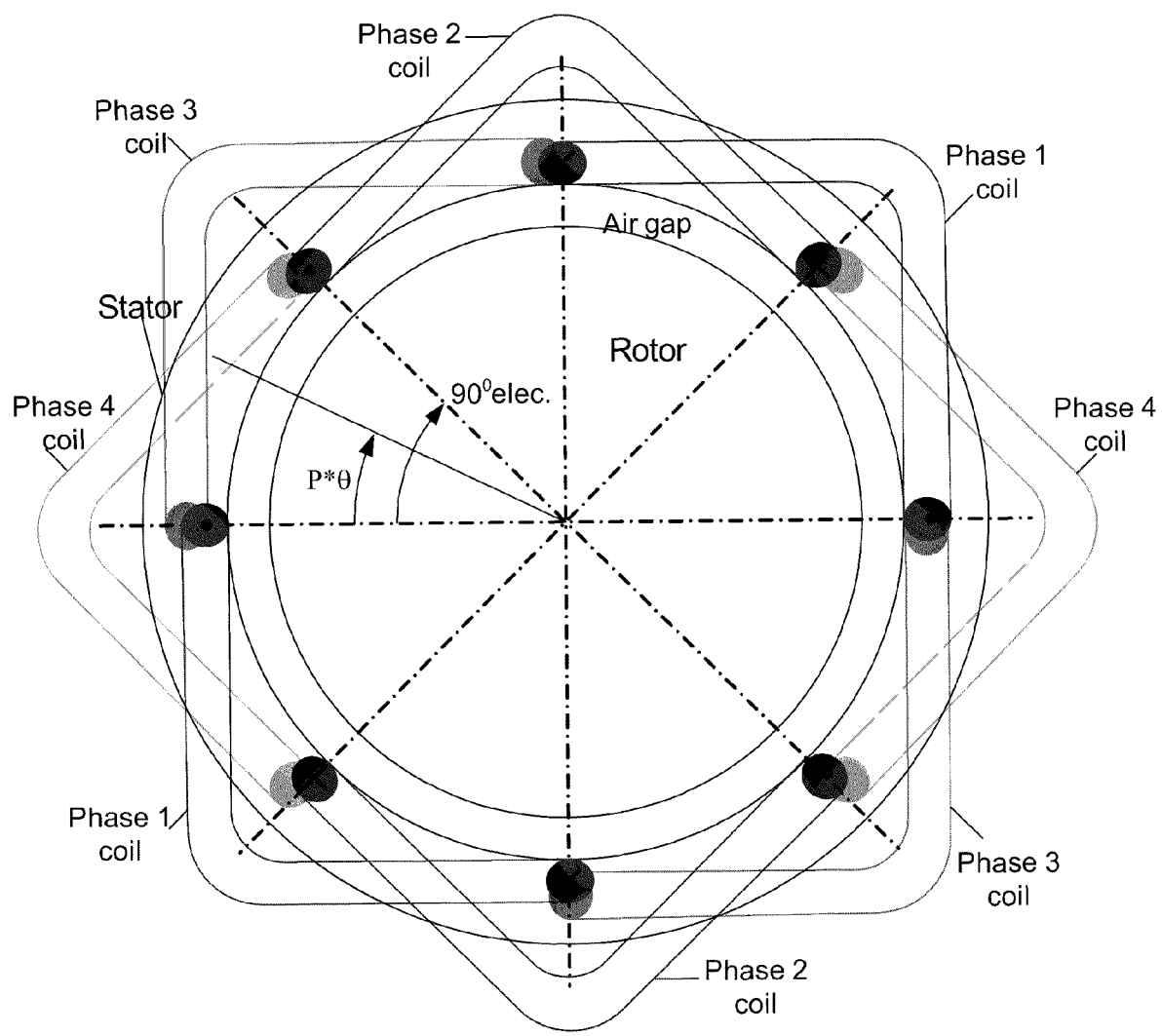
FIG. 2 is another exemplary portion of a four pole machine with four phase windings in cross-section.

In FIG. 1, the four-pole machine includes a set of two-phase windings. In other four-pole machines distributed windings, concentrated pole windings, etc., are used. In FIG. 1, the electrical angular location in the air gap may be tracked by the angle p*θ that is the product of the pole-pair, p, and the mechanical angle θ. The phase-1 coils may provide an angular reference for the two-phase machine with the phase-2 coil starts at about 90 electrical degrees from this reference. The exemplary orientation may be maintained for other two-phase machine with any number of poles such as the system shown in FIG. 2 illustrating a four pole machine that has four-phase windings.

Figure 3:
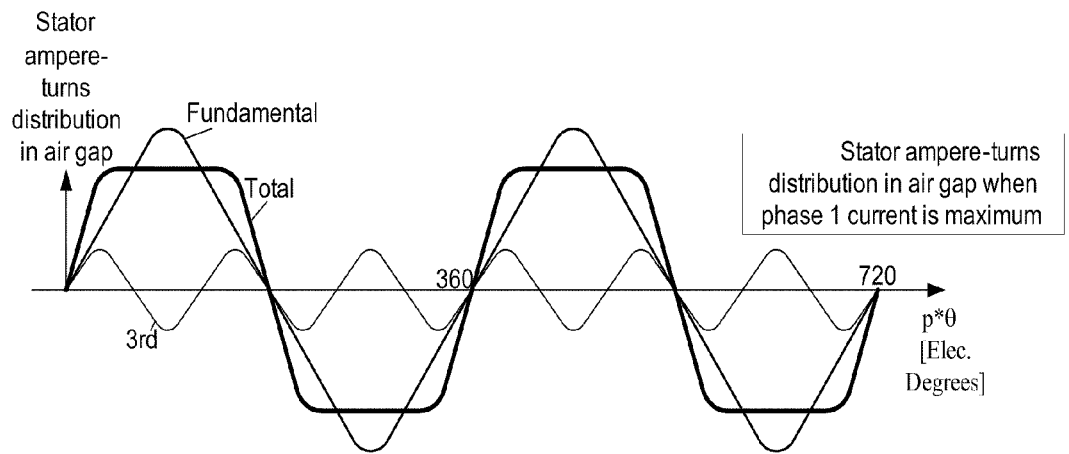
FIG. 3 is an exemplary stator ampere-turn distribution.

FIG. 3 shows the stator ampere-turns distribution in an air gap when the phase current passing through phase-1 coils is at a peak value, and the phase-2 coil current is about zero. The total current distribution (e.g., amperage) shown by the thicker line has a substantially trapezoidal shape and has a lower maximum value (or peak) than the fundamental component. The air gap flux is produced by the ampere-turns that overcame the reluctances of the air gap and the magnetic paths in various parts of the stator and rotor. As shown the air gap flux has about the same shape of the ampere-turns distribution but with a magnetic saturation influence.

Figure 4:
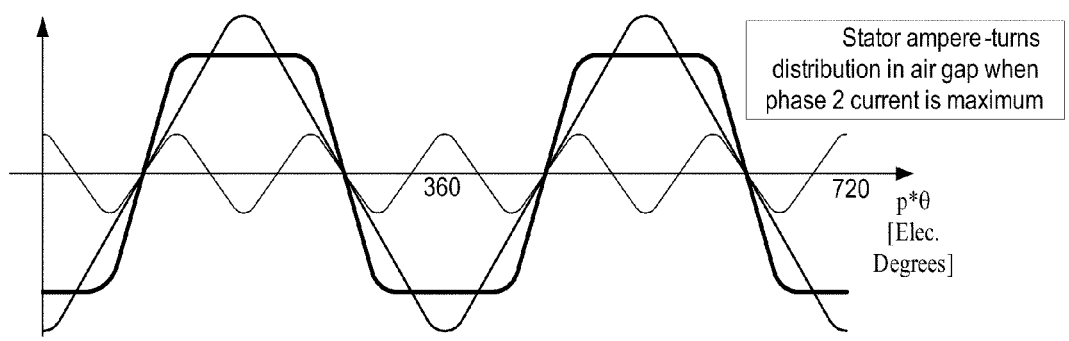
FIG. 4 is another exemplary stator ampere-turn distribution.

FIG. 4 shows the distribution when the phase-2 current is at its peak value, and the phase-1 coil current is about zero. The total ampere-turns distribution in the air gap for phase-1 or phase-2 may include a fundamental sine wave component and a third-harmonic component (e.g., labeled $3^{rd}$ or shown as the smaller magnitude waveform). In FIGS. 3 and 4, the fundamental component has four poles and the third-harmonic component has 3 times the fundamental pole numbers. To produce a smooth air gap flux and/or a third harmonic torque by the interaction of the stator third-harmonic ampere-turns and the rotor third-harmonic flux, the stator third-harmonic ampere-turns rotates at the same or nearly the same speed as the rotor. The third-harmonic stator current may be controlled by a controller or processor remote or local to the electric machine and may interface a pulse width modulated (PWM) device, an injector, or an inverter circuit. In other systems, the third-harmonic stator current is controlled by remote or local current control devices that shape the waveform of the phase current. In this example, when less third harmonic current component is needed the total current wave form may assume a more sinusoidal shape.

Figure 5:
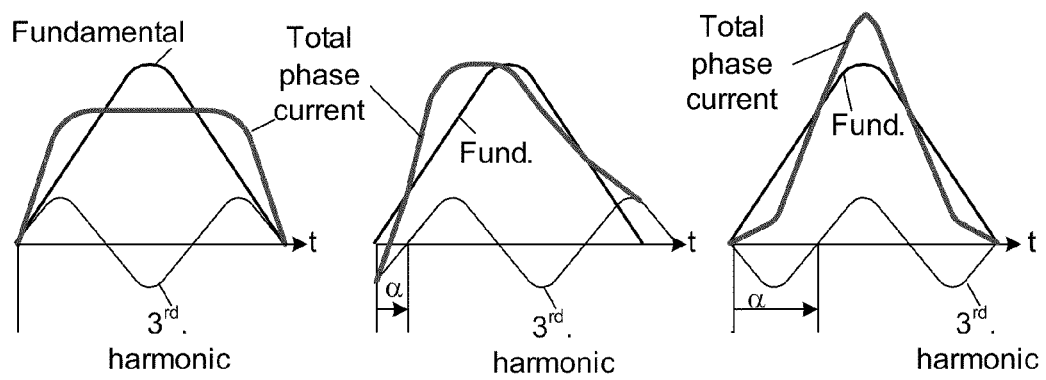
FIG. 5 are exemplary controllable total phase currents.

The total phase current may be controlled locally or remotely. A local or remote controller (or injector) may adjust the magnitude and phase shift angle, α, of its third-harmonic component. Adding the desirable fundamental and third harmonic currents may render different current waveforms. The control may adjust the shape and phase as shown by the exemplary currents in the time domain of FIG. 5.

A two-phase (or four-phase) model may mathematically represent how a third-harmonic injected into the stator winding changes the shape of an air-gap flux distribution. In FIG. 3, a phase-1 pulsating third-harmonic ampere-turns distribution may modeled by the third-harmonic space wave form, sin(3·p·θ−0), where p is the number of pole pairs and θ is the mechanical angle multiplied by a third-harmonic current, A·cos(3·t−α), where A is the magnitude of the third-harmonic ampere-turns, t is time in seconds, and α is the shift angle of the third-harmonic current.

$$\sin(3 \cdot p \cdot \theta - 0) \cdot A \cdot \cos(3 \cdot t - \alpha) \quad (1)$$

The phase-2 pulsating third-harmonic ampere-turns distribution is modeled by lagging 3·90° in both the space and time domains.

$$\sin(3 \cdot p \cdot \theta - 3 \cdot 90°) \cdot A \cdot \cos(3 \cdot t - 3 \cdot 90° - \alpha) \quad (2)$$

Equations (1) and (2) of the pulsating waves may be expanded to their forward and backward rotating components as shown in Equations (3) and (4) respectively.

$$\sin(3 \cdot p \cdot \theta - 0) \cdot A \cdot \cos(3 \cdot t - \alpha) = \qquad (3)$$
$$\frac{A}{2}[\sin(3 \cdot p \cdot \theta + 3 \cdot t - \alpha) + \sin(3 \cdot p \cdot \theta - 3 \cdot t + \alpha)]$$

$$\sin(3 \cdot p \cdot \theta - 3 \cdot 90°) \cdot A \cdot \cos(3 \cdot p \cdot \theta - 3 \cdot 90° - \alpha) = \qquad (4)$$
$$\frac{A}{2}[\sin(3 \cdot p \cdot \theta - 270° + 3 \cdot t - 270° - \alpha) +$$
$$\sin(3 \cdot p \cdot \theta - 270° - 3 \cdot t + 270° + \alpha)] =$$
$$\frac{A}{2}[\sin(3 \cdot p \cdot \theta + 3 \cdot t - \alpha - 540°) + \sin(3 \cdot p \cdot \theta - 3 \cdot t + \alpha)]$$

A resultant third-harmonic rotating field may be represented by the sum of the two phase fields. Adding the right hand sides of (3) and (4) renders Equation 5.

$$\frac{A}{2}[\sin(3 \cdot p \cdot \theta + 3 \cdot t - \alpha) + \sin(3 \cdot p \cdot \theta - 3 \cdot t + \alpha)] + \qquad (5)$$
$$\frac{A}{2}[\sin(3 \cdot p \cdot \theta + 3 \cdot t - \alpha - 540°) + \sin(3 \cdot p \cdot \theta - 3 \cdot t + \alpha)]_F =$$
$$A\sin(3 \cdot p \cdot \theta - 3 \cdot t + \alpha)$$

from equation (5) the electric angular speed of the third-harmonic rotating field is the angle over time. As shown in simplified form, the third-harmonic rotating field is the same $$\frac{3 \cdot p \cdot \theta}{3 \cdot t} = \frac{p \cdot \theta}{t}$$

as the angular speed is the same as the fundamental frequency rotating field. Thus, by injecting (or receiving) $3^{rd}$ harmonic currents into two or four-phase windings of an electric machine an electromotive force (emf) is produced when the rotating air gap flux cuts the stator winding. Distribution and coil pitch factors (e.g., winding factors) may, in part, determine the difference in shapes between the air gap flux and the back emf. In these systems, the third-harmonic torque magnitude may be controlled by the third-harmonic current magnitude and its phase shift. The shape of the total phase current may be controlled by adjusting the magnitude of the third-harmonic current and its shift angle. By shaping rotor surfaces, in some systems, a third harmonic flux in the air gap may be produced. While not limited to any stator type (e.g., may include concentric windings, distributed windings, and/or etc.), in some applications, the technology may be applied to substantially round or substantially rectangular bobbin wound cores. Some of bobbin wound cores systems may not operate by injecting or receiving a third-harmonic current.

Figure 6:
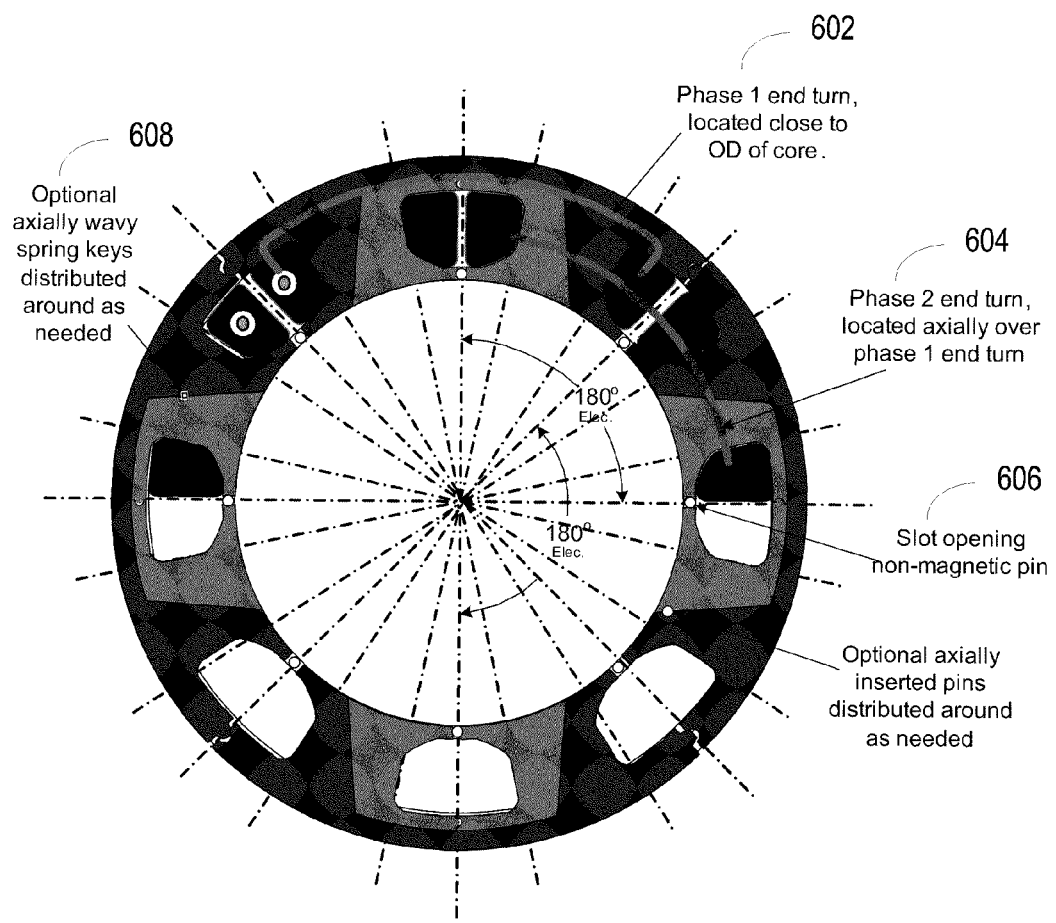
FIG. 6 is an exemplary portion of a two or four phase, four pole full-phase bobbin-wound electric machine in cross-section.
Figure 7:
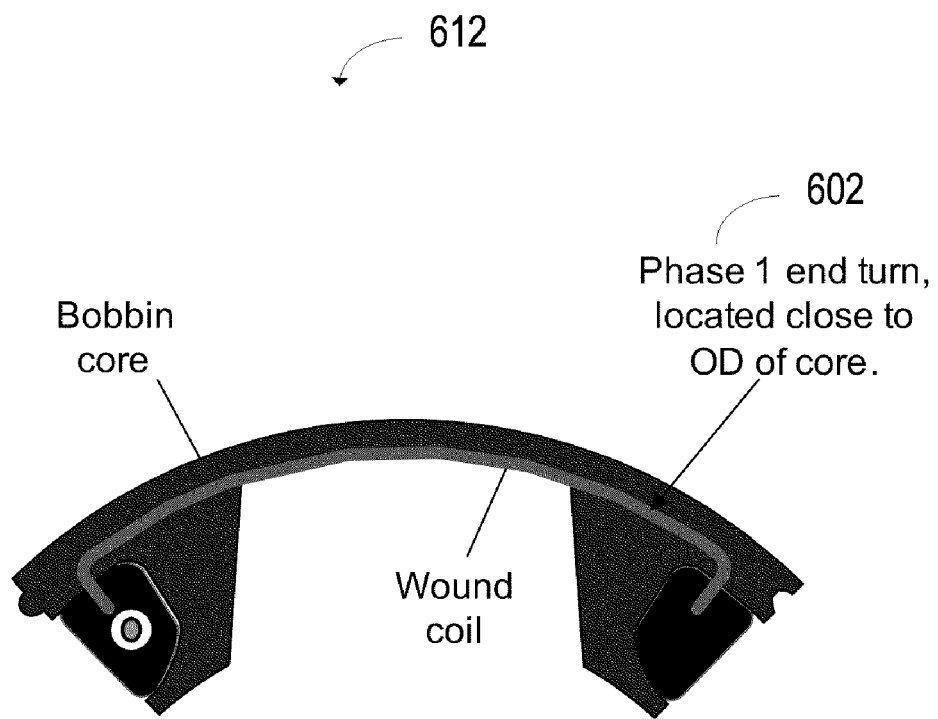
FIG. 7 is an exemplary portion of an outer wound bobbin core in cross-section.
Figure 8:
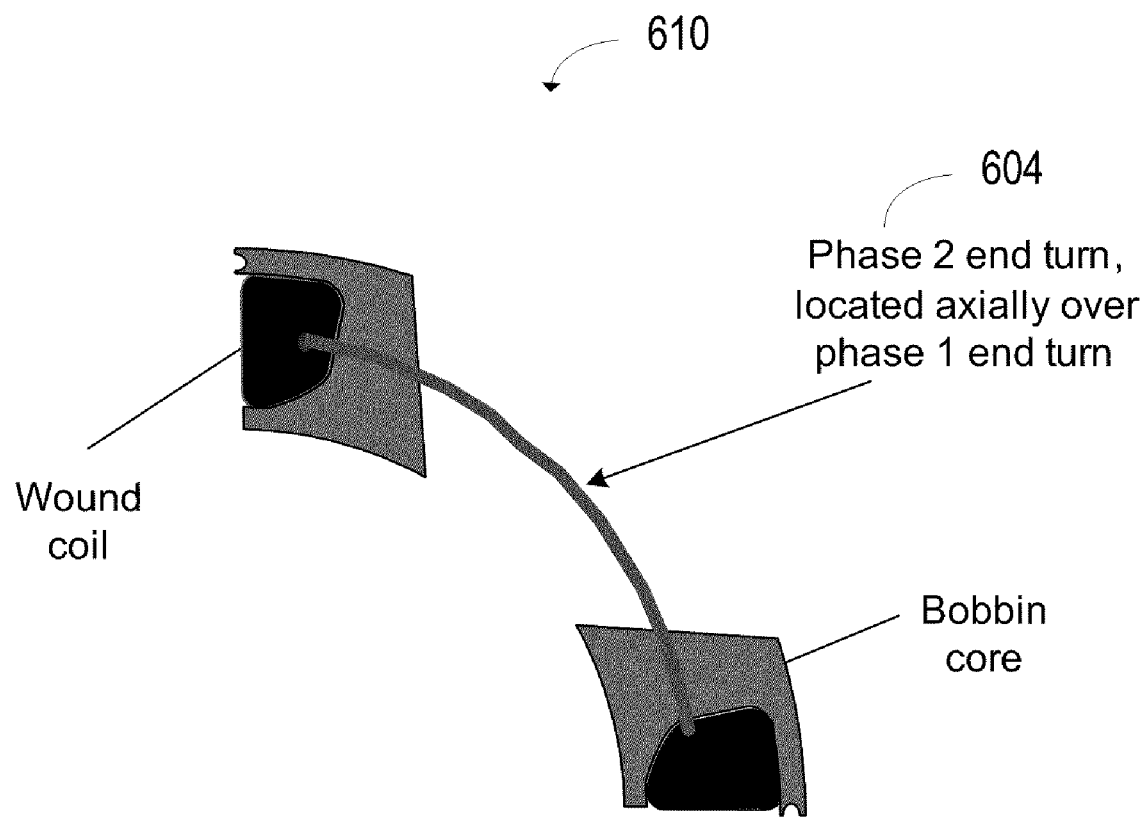
FIG. 8 is an exemplary portion of an inner wound bobbin core in cross-section.

The wires of some wound coils may be wrapped around many core shapes without crossing. A high slot fill factor may be achieved and labor cost may be reduced when automation winders wind the cores. FIG. 6 is cross-section of a portion of a four-pole machine that has four bobbin wound outer cores and four inner cores. The available phase span for each core is (or is about) 180 electric degrees. In FIG. 6, the first phase (or phase-1) end turn 602 is positioned near an outer diameter of the core. The second phase (or phase-2) end turn 604 is located axially over the phase-1 end turn. Non-magnetic slot-openings 606 that may receive non-magnetic connectors or pins may be positioned near the center region of the inner surface of the core. In FIGS. 6 and 8, the inner cores 610 comprise curved parallelepiped-like cross-sections. In FIGS. 6 and 7 the outer cores 612 comprise wedge-like cross-sections joined by annular portions that may bound a cavity region. In some machines, axially wavy spring keys 608 may be distributed between the outer bobbin wound cores 612 and the inner bobbin wound cores 610 to secure them in the radial direction after assembly.

FIG. 7 shows the outer core 612 and FIG. 8 shows the inner core 610. The separate cores 610 and 612 may comprise magnetically conducting materials, such as mild steel laminations, silicon steel laminations, and compressed, or sintered soft magnetic powders, etc. To prevent interference between the end windings the phase-1 end turns 602 may be located near the outer diameter of the outer core 612. The phase-2 end turns 604 may be located axially over the phase-1 end turns 602. The bobbin wound coils may be wound externally which allows the windings to be aligned and achieve an orderly, high slot fill factor.

Figure 9:
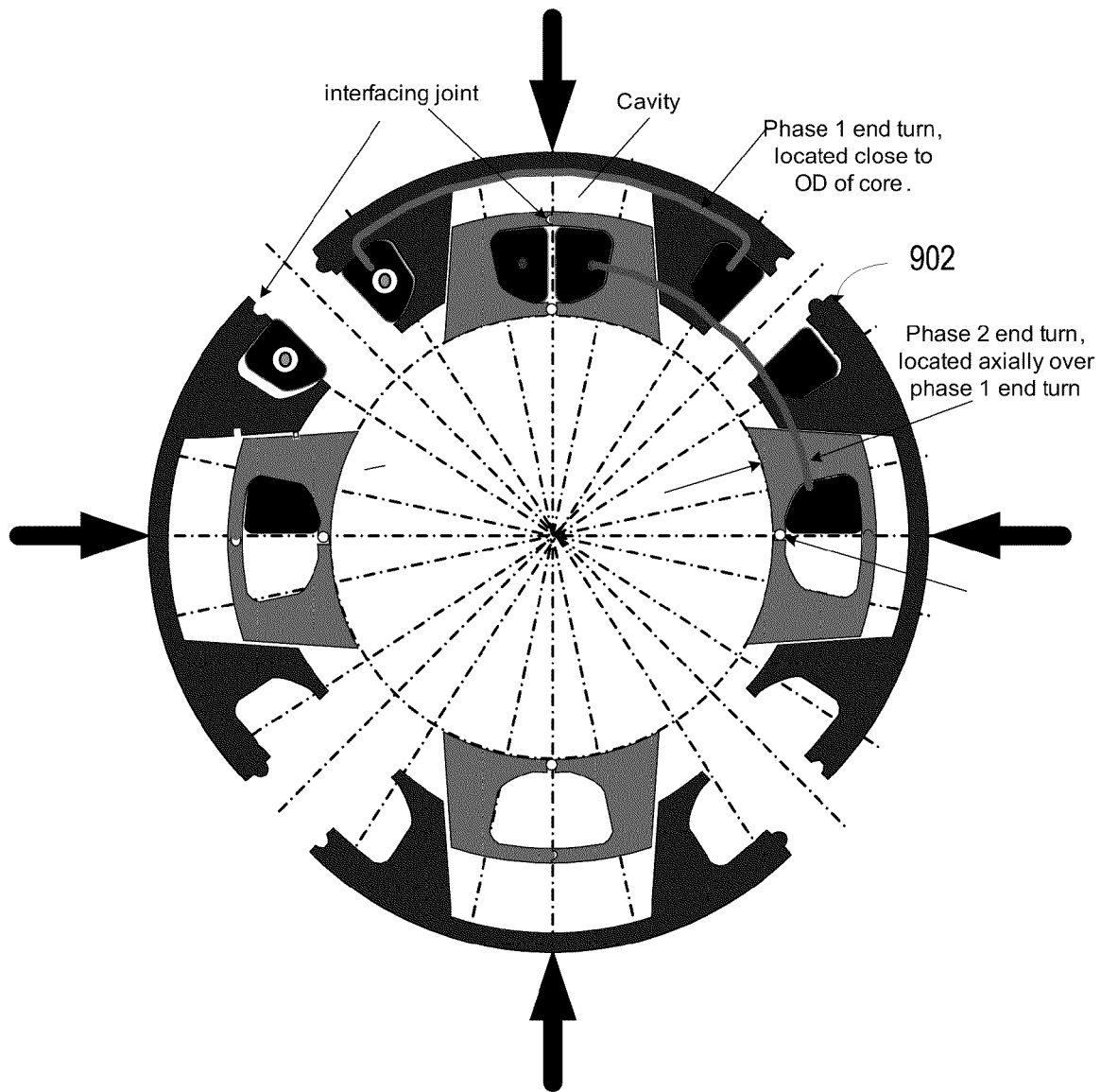
FIG. 9 is a partially assembled portion of a two or a four-phase bobbin wound cores in cross-section.
Figure 10:
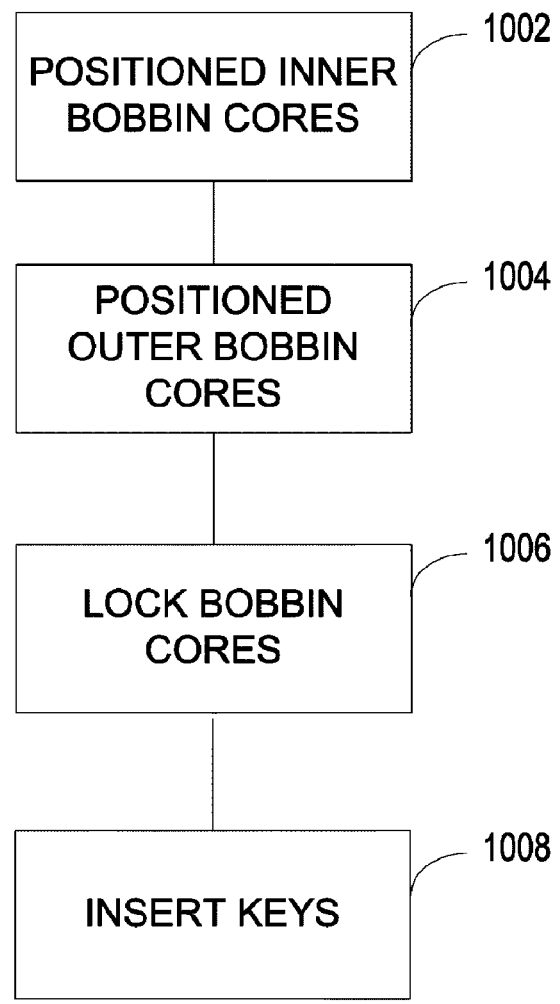
FIG. 10 is a process of assembling two or four-phase bobbin wound cores.

FIG. 9 shows partially assembled two or four-phase bobbin wound cores in cross-section and FIG. 10 is the process of assembling those cores. At 1002, the inner bobbin cores 610 sections are positioned in a center area. Guiding tools or fixtures (not shown) may position the inner bobbin cores 610. At 1004, outer bobbin core 612 sections may be radially biased toward the inner bobbin cores 610. The cavities of the outer bobbin cores 612 may face, respectively, toward the annular shaped male and female interfacing joints of the inner bobbin cores 610. When the bobbin cores 610 and 612 are in position, an outer cylindrical member (e.g., such as a thin member 902 shown in cross-section) may bias, press, thermally secure and/or lock the outer bobbin cores 612 to the inner bobbin cores 610 at 1006. In some systems and processes, non magnetic pins and/or axially wavy spring keys may mechanically interlock the bobbin cores 610 and 612 and strengthen mechanical integrity at 1008.

Some systems and processes of FIGS. 6-10 may use the third-harmonic ampere-turns in the air gap to modify the shape of the air gap flux distribution. Those systems may receive or inject third harmonic current that produces a harmonic flux that is synchronous with a fundamental frequency current. In those systems, the shape of the back emf may be modified and may produce a smooth third-harmonic torque.

Figure 11:
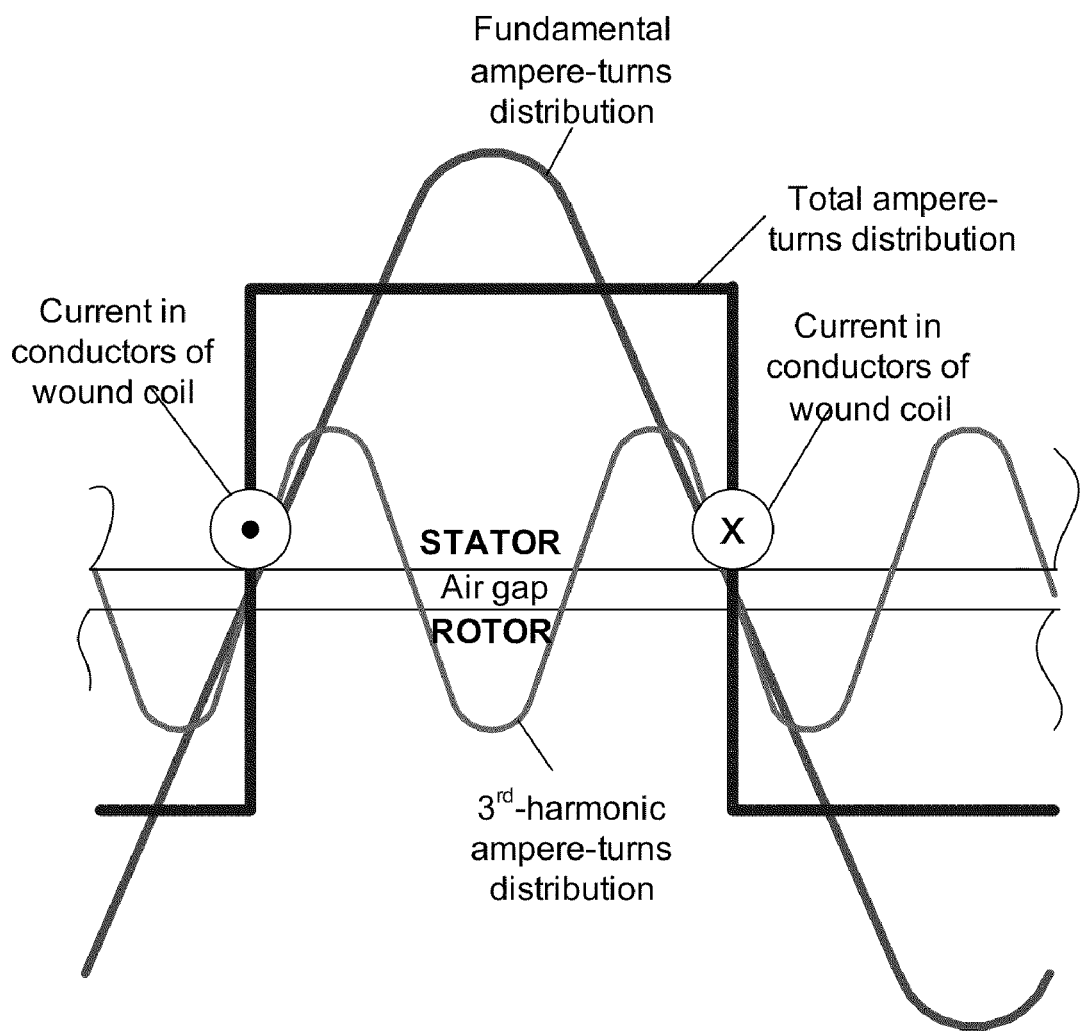
FIG. 11 shows the stator currents in wound bobbin coils that may produce fundamental and the dominating third-harmonic ampere-turn distributions in the air gap.

FIG. 11 shows the stator currents in exemplary wound bobbin coils that may produce fundamental and the dominating third-harmonic ampere-turn distributions in the air gap. The trapezoidal (or substantially trapezoidal) shape of the total ampere-turn distribution may be broken down into (or comprise) the fundamental and the dominating third-harmonic ampere-turn. The rotor third harmonic flux and the stator third-harmonic ampere-turn distributions may be affected by the air-gap length and the saturation of the magnetic path. Unlike some technologies that may modify rotor surfaces for noise and loss reductions, the modulations of third-harmonic air gap flux and the use of stator third-harmonic ampere-turns generates voltage and torque. The air gap length of the bobbin-wound core machine provides a linear modulation and the magnetic path provides a non-linear modulation for the third-harmonic rotor flux and the stator third-harmonic ampere-turn distributions in the air gap.

The systems and processes of FIGS. 6-11 describe aspects of a bobbin-core technology that enables 180-electric-degree phase span for each phase for a two-phase or four-phase electric machine. Uniform slot fill factors for all phases may be ensured and may interface any number of poles or pole structures. Substantially round or substantially rectangular wires may be wound about the outer bobbin 612 and inner bobbin 610 wound cores. Automated winding devices may improve the slot fill factor by minimizing undesirable space between the wires. Cavity coupling, axially inserted non-magnetic pins, and wavy spring keys may support or strengthen the mechanical integrity of the multi-phase electric machines. In some applications the third-space-harmonic contents and the stator ampere-turns distributions may be controlled by modifying the air gap through the shape of the pole arc of the bobbin cores and/or by modifying the shape of the magnetic paths of the bobbin core.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A two-phase or four-phase electric machine comprising:
    a first stator part and a second stator part disposed about ninety electrical degrees apart;
    a plurality of stator pole parts positioned near the first stator part and the second stator part;
    an injector that injects a third-harmonic frequency current that is separate from and not produced by the fundamental current driving the first stator part and the second stator part; and
    where the electric angular speed of the third-harmonic rotating field comprises $$\frac{p \cdot \theta}{t},$$

where p comprises the number of pole pairs, θ comprises a mechanical angle and t comprise time in seconds.

2. The two-phase or four-phase electric machine of claim 1 where first stator part and the second stator part comprises windings, a shape of the windings back electromotive force is modified by the injection of the third-harmonic frequency current.

3. The two-phase or four-phase electric machine of claim 1 where a third-harmonic torque magnitude is controlled by a magnitude of the third-harmonic frequency current and its phase shift.

4. The two-phase or four-phase electric machine of claim 1 where the first stator part generates phase-1 and the second stator part generates phase-2 and an ampere-turns distribution in an air gap for phase-1 or phase-2 consists of a fundamental sine wave component and a third-harmonic component.

5. The two-phase or four-phase electric machine of claim 4 where the fundamental sine wave component has three poles and the third-harmonic component has three times the number of pole numbers.

6. The two-phase or four-phase electric machine of claim 1 further comprising a rotor spaced apart from the first stator part and a second stator part, the rotor generating a third-harmonic flux rotating at substantially the same angular speed as stator third-harmonic ampere turns.

7. The two-phase or four-phase electric machine of claim 1 where the stator current flowing through the first stator part and the second stator part is controlled by a remote pulse-width-modulation device.

8. The two-phase or four-phase electric machine of claim 1 where the stator current flowing through the first stator part and the second stator part is controlled by a current source.

9. The two-phase or four-phase electric machine of claim 1 where a magnitude and a phase shift of the third-harmonic frequency current is adjusted through an adjustment of a controller that controls a total phase current.

10. The two-phase or four-phase electric machine of claim 1 where the first stator part and the second stator part couples a voltage source inverter.

11. The two-phase or four-phase electric machine of claim 1 where the first stator part and the second stator part couples a current source inverter.

12. The two-phase or four-phase electric machine of claim 1 where the first stator part and the second stator part couples a utility power supply with a third harmonic injection.

13. The two-phase or four-phase electric machine of claim 1 where the first stator part and the second stator part couples a utility power supply without a third harmonic injection.

14. The two-phase or four-phase electric machine of claim 1 where the electric machine comprises a permanent magnet machine.

15. The two-phase or four-phase electric machine of claim 1 where the electric machine comprises a permanent magnet-less synchronous machine.

16. The two-phase or four-phase electric machine of claim 1 where the electric machine comprises a motor.

17. The two-phase or four-phase electric machine of claim 1 where the electric machine comprises a generator.

18. A two-phase or four-phase electric machine comprising:
    a first stator part comprising a plurality of inner bobbin wound cores;
    a second stator part comprising a plurality of outer bobbin wound cores each mechanically biased against at least one of the plurality inner bobbin wound cores; and
    a cylindrical support biasing an outer diameter of the outer bobbin wound core against an outer surface of the inner bobbin wound core; and
    where a first-phase and a second-phase of the electric machine enables about a one-hundred and eighty-electric degree phase span for each phase of the two phases.

19. The two-phase or four-phase electric machine of claim 18 where the second stator parts each include a uniform cavity dimensioned in cross-section to enclose at least three sides of only one of the plurality of inner bobbin wound cores.

20. The two-phase or four-phase electric machine of claim 18 where the plurality of inner bobbin wound cores and the plurality of outer bobbin wound cores are wound with a substantially round wire.

21. The two-phase or four-phase electric machine of claim 18 where the plurality of inner bobbin wound cores include an aperture to receive non-magnetic pins and the plurality of inner bobbin wound cores and the plurality of outer bobbin wound cores are further biased by axially wavy springs.

22. The two-phase or four-phase electric machine of claim 18 where cavities and axially inserted non-magnetic pins and axially wavy spring keys mechanically interlock the inner and outer bobbin wound cores.

23. A method of assembling a two-phase or four-phase electric machine comprising:
    positioning inner bobbin cores in a center region;
    biasing outer bobbin cores toward the inner bobbin cores so that cavities within the outer bobbin cores face respectively interfacing joints of the inner bobbin cores;
    inserting an axial direction axially wavy spring keys;
    positioning a cylindrical member against an outer diameter of the outer bobbin cores to maintain the mechanical integrity of two-phase or four-phase bobbin wound cores.

* * * * *